United States Patent [19]
Glaister
[11] Patent Number: 4,988,566
[45] Date of Patent: Jan. 29, 1991

[54] FLUOROCARBON POLYMER COMPOSITIONS AND ARTICLES SHAPED THEREFROM

[76] Inventor: Frank J. Glaister, 18 Mulholland Dr., Ipswich, Mass. 01938

[21] Appl. No.: 339,116

[22] Filed: Apr. 14, 1989

Related U.S. Application Data

[60] Division of Ser. No. 19,345, Feb. 26, 1987, Pat. No. 4,844,982, which is a division of Ser. No. 762,791, Aug. 2, 1985, Pat. No. 4,666,642, which is a continuation of Ser. No. 549,500, Nov. 7, 1983, abandoned.

[51] Int. Cl.[5] .......................... C08L 27/12; B32B 9/00; B32B 27/00

[52] U.S. Cl. .................................... 428/407; 428/357; 428/402; 428/403; 428/421; 428/422; 525/199; 525/276

[58] Field of Search ............... 525/129, 192, 199, 276, 525/287, 326.3, 375; 526/249, 247, 252, 255; 428/357, 402, 403, 407, 421, 422

[56] References Cited

U.S. PATENT DOCUMENTS

| | | | |
|---|---|---|---|
| Re. 28,628 | 11/1975 | Carlson | 526/249 X |
| Re. 31,103 | 12/1982 | Gotcher et al. | 428/379 X |
| 3,947,525 | 3/1976 | Robertson et al. | 525/287 X |
| 3,962,373 | 6/1976 | Petrucelli | 525/199 |
| 4,051,003 | 9/1977 | Aronoff et al. | 525/185 |
| 4,094,949 | 6/1978 | Yokokawa et al. | 525/199 X |
| 4,176,027 | 11/1979 | Gotcher et al. | 525/375 X |
| 4,200,568 | 4/1980 | Trautvetter | 525/199 X |
| 4,353,961 | 10/1982 | Gotcher et al. | 525/276 X |

*Primary Examiner*—Lorraine T. Kendell
*Attorney, Agent, or Firm*—Henry C. Nields

[57] ABSTRACT

High strength, flexible compositions with improved mechanical properties at elevated temperatures for wire insulation coatings and other shaped articles used in hostile environments are disclosed, consisting of a high temperature fluorocarbon polymer, such as an ethylene-tetrafluoroethylene copolymer or the like, and from abot 1% wt. to about 50% wt. of a polyvinylidene fluoride compound.

2 Claims, No Drawings

FLUOROCARBON POLYMER COMPOSITIONS AND ARTICLES SHAPED THEREFROM

This application is a division of application Ser. No. 019,345, filed Feb. 26, 1987, now U.S. Pat. No. 4,844,982, which is a division of Ser. No. 762,791, filed Aug. 2, 1985, now U.S. Pat. No. 4,666,642, which is a continuation of Ser. No. 549,500, filed Nov. 7, 1983, now abandoned.

BACKGROUND OF THE INVENTION

1. Technical Field

The field of this invention is crosslinkable fluorocarbon polymers and, in particular, high temperature compositions for wire coatings and the like.

2. Description of Prior Art

Various polymer compositions are known for electrical insulating purposes, such as wire insulation and mold-shaped insulating pieces. However, few compositions are capable of withstanding hostile environments such as those typically encountered in, for example, airplane wiring. In such environments, insulating compositions can encounter mechanical stress, wear, salt-laden moisture, corrosive cleaning fluids, oils and fuels, and low and high temperatures. One of the most important criteria for airplane wire is that it be able to withstand high temperatures without melting when a flash fire occurs, for example.

Some of the existing polymer compositions for hostile environments are polyimide materials, such as Kapton ®, an aromatic polyimide material manufactured by the Dupont Company of Wilmington, Delaware. The polyimide-based wire coatings have good thermal properties, but unfortunately suffer from cracking and embrittlement over time. Modifications which decreased the cracking problem in polyimide insulated wires apparently have lead to excessive stiffness and greater susceptibility to corrosion and chafing. The problem is so serious that a recent article in *Defense Electronics*, Jan., 1983, suggests that polyimide wiring harness insulation, especially in exposed areas, has caused short circuits in key aircraft systems.

In another approach to developing durable insulators, efforts have been made to irradiation crosslink so-called "high temperature" fluorocarbon polymers, such as ethylene-tetrafluoroethylene copolymers (ETFE) and ethylene-chlorotrifluoroethylene (E-CTFE) as the insulation. However, conventional radiation crosslinking promoters have not worked well with these fluorocarbon polymers. Because fluorocarbon polymers, such as EFTE and E-CTFE, have high melting points, volatile crosslinking promoters such as triallyl cyanurate and its isomer, triallyl isocyanurate, are ineffective. For a variety of fluorocarbon polymers, temperatures above 250° C. are required for extrusion or injection molding to fabricate shaped articles such as wire insulation, sheets, films, tubing, gaskets and boots. When promoters are added to high temperature fluorocarbon polymers prior to processing, the polymers tend to prematurely crosslink and to form gels or lumps, discolor and often to form voids in the final product.

Various compounds have been proposed as substitutes for conventional crosslinking promoters to form durable, high temperature polymers. See, for example, U.S. Pat. Nos. 3,840,619, 3,894,118 and 3,911,193 issued to Aronoff, which disclose the use of allylic esters of polycarboxylic acids in crosslinking agents for fluorocarbon polymers. See also, U.S. Pat. Nos. 3,970,770, 3,985,716 and 3,995,091 issued to Dhami, which disclose the use of esters of sulfonyl dibenzoic acid as crosslinking agents. Additionally, U.S. Pat. No. 3,894,118 issued to Aronoff discloses crosslinking agents composed of esters of dimethacrylic acid. Despite these numerous disclosures the industry has not been totally satisfied by any of the available crosslinking promoters and many fluorocarbon polymers are still underutilized because they have not responded well to attempts at radiation-induced crosslinking using either the new classes of promoters or the more conventional promoters.

In U.S. Pat. No. 4,353,961 issued to Gotcher, a method is disclosed for forming shaped articles from high temperature fluorocarbon polymers, wherein the polymer is first processed at or above its melting point and then permitted to cool and "imbibe" a promoter before being crosslinked by radiation. This method, which requires immersion of the shaped product in a trough or the like filled with the promoter, poses handling problems and adds a time-consuming, additional step to the manufacturing process.

There exists a need for fluorocarbon polymer compositions suitable for use in high temperature environments and which can be satisfactorily radiation crosslinked in an efficient manner. In particular, there exists a need for fluorocarbon-based compositions, for shaped articles and wire coatings, which can be processed and crosslinked without resort to difficult, time-consuming, post-processing, immersion in promoters.

SUMMARY OF THE INVENTION

It has been discovered that high temperature fluorocarbon polymers can be blended with polyvinylidene fluoride and processed at high temperatures and, further, that the resultant material can be highly crosslinked by radiation with or without promoters. In particular, ETFE and E-CTFE fluorocarbon polymers may be mixed with polyvinylidene fluoride and then processed and crosslinked to produce wire coatings and the like, possessing excellent electrical insulation properties, resistance to deformation at high temperatures, as well as flexibility, durability and thermal stability in hostile environments.

In another aspect of my invention it has been found that small amounts (i.e. up to 4 percent) of promoters can be absorbed by powdered polyvinylidene fluoride and added to the composition prior to processing to yield a smooth non-porous extruded insulation coating which becomes highly crosslinked at lower radiation levels.

The fluorocarbon polymers which may be blended with polyvinylidene fluoride to produce the high temperature compositions of this invention include for example, fluorocarbon copolymers and terpolymers. Preferred fluorocarbon polymers include ETFE fluorocarbon polymers, such as Tefzel ® manufactured by the Dupont Company of Wilmington, Delaware and E-CTFE fluorocarbon polymers, such as Halar ® manufactured by Allied Corporation, Plastics Division of Morristown, N.J. See U.S. Pat. Reissue No. 28,628 issued to Carlson, herein incorporated by reference, for further description of these polymers.

More generally, the fluorocarbon copolymers and terpolymers are defined as having carbon polymer backbones and about 10% or more fluorine, and having melting points of above about 240° C. (as evidenced by a drop in viscosity and general lack of crystalline structure). These polymers also require high processing temperatures usually in excess of 250° C. for forming into shaped articles by extrusion or molding.

The polyvinylidene fluoride compounds useful in this invention may take a variety of forms and compositions. One preferred compound is the grade 460 polyvinylidene fluoride manufactured by Pennwalt, Inc. of Philadelphia, Pa. and sold under the trademark Kynar®. The Kynar 460 and 461 homopolymers have a specific gravity of about 1.75—1.78, a melting temperature of about 320° F. and a melt viscosity of about 28,000±2500 poise at 450° F. and 100 $sec^{-1}$ shear rate.

The invention will next be described in connection with certain working examples and experimental results. However, it should be clear that various changes and modifications can be made by those skilled in the art without departing from the spirit and scope of the invention. Pigments, such as $TiO_2$ and ZnO, stabilizers, antioxidants, flame retardants, acid acceptors, processing aids and other additives can also be added to the compositions described herein. Conventional or new crosslinking promoters may be absorbed prior to processing in order to further improve crosslinking. While crosslinking by ionizing radiation is the preferred method of curing the compositions of this invention, other methods for crosslinking can also be employed. The dose of radiation necessary for curing typically will vary from about 5 megarads to 25 megarads, although in some instances a greater amount may be necessary for certain properties. These doses can be found by those skilled in this art without undue experimentation.

DESCRIPTION OF THE PREFERRED EMBODIMENTS

The following working and comparative examples are presented as illustrative of the compositions claimed herein:

EXAMPLE I

Pellets of ethylene-tetrafluoroethylene (Tefzel 280) were blended with pellets of polyvinylidene fluoride (Kynar 460) in the ratio of five parts Kynar to 100 parts Tefzel and then fed into the hopper of a mixer. The mixed stock was extruded onto wire of a stock temperature of about 335° C. (Profile 305° to 365°). The coating was smooth and free of porosity, gels, lumps and sparkouts. The coating was then crosslinked at a radiation dose of about 25 megarads to form a product with excellent resistance to deformation at temperatures as high as 300° C.

EXAMPLE II

Similarly pellets of ethylene-chlorotrifluoroethylene copolymer (Halar) were blended with pellets of polyvinylidene fluoride in the ratio of five parts polyvinylidene fluoride to 100 parts Halar. The blend was extruded as in Example I to form a product with resistance to deformation at 300° C. after irradiation at about 25 MR.

EXAMPLE III

Pellets of ethylene-tetrafluoroethylene (Tefzel 280) and pellets of polyvinylidene fluoride (Kynar 460) were first coated with liquid triallylisocyanurate (TAIC) and then coated with powdered polyvinylidene fluoride (Kynar 461) in the ratio of about 1-10 parts Kynar, about 0.1-4.0 parts TAIC and 100 parts Tefzel. Sufficient powdered Kynar was added to absorb the excess TAIC. After blending with various compounding ingredients, the blend was fed into the hopper of an extruder and extruded onto wire at a melt temperature of about 335° C. (Profile 305°-365° C.). A blend according to the formula in Table I was extruded to produce a smooth, porosity-free coating without sparkouts. When irradiated at about 20 MR, it exhibited excellent resistance to deformation at 300° C.

TABLE 1

| | |
|---|---|
| Tefzel 280 | 100.0 |
| Kynar 460 (pellets) | 3.0 |
| Kynar 461 (powder) | 2.0 |
| TAIC | 1.0 |
| Compounding ingredients ($ZnO/TiO_2$ - a color concentrate) | 3.0 |

COMPARATIVE EXAMPLE I

A blend of Tefzel and just TAIC, when extruded onto wire produced an extremely rough porous coating with little integrity and unsuitable for further consideration. This is also disclosed in prior art, e.g., U.S. Pat. No. 4,353,961.

COMPARATIVE EXAMPLE II

Pellets of unmodified Tefzel were mixed and extruded onto wire at a temperature of about 335° C. (Profile 305° to 365° C.). Attempts to crosslink the coating at low radiation doses failed as evidenced by melting. A measure of crosslinking was achieved at 50 MR but, as discussed below, the coating failed to meet the high temperature performance specifications because of a tendency to melt and flow.

The wire coatings produced above were subjected to a variety of tests established by the wire and cable industry and Military specifications. For high temperature applications, the most important tests of the coatings were the solder iron test and the mandrel test. The solder iron test, which is described in MIL-W-16878 specification and used in the wire and cable industry to determine whether adequate crosslinking of the insulation has been achieved, consists of a solder iron fastened to an upright frame by a rigid hinge located on the solder iron handle. The solder iron tip has an angle of 45° and forms a flat surface with an asbestos sheet. The solder iron tip has a bearing surface of ½". The iron is weighted to provide a 1½ pound force bearing down on the insulated wire (a 20 AWG conductor with a 10 mil wall). The apparatus includes equipment sufficient to measure and to control the temperature at the solder iron to within 345°±10° C. The apparatus also has a 30 to 50 volt electric circuit arranged to indicate a burn-through or melt-through failure when the solder iron tip contacts the conductor. A satisfactorily crosslinked insulation will withstand melt through for more then 6 minutes.

The 7-hour at 300° C. mandrel test which is described in MIL-W-22759 specification as an accelerated aging test also measures the ability of the insulation to resist flow under pressure. It is carried out on a 24" sample of the finished wire which has 1" of insulation removed from each end. The central portion of the specimen then is bent at least halfway around a cylindrical, smooth, polished stainless steel mandrel having a ½" diameter. Each end of the conductor is loaded with a ¾ pound weight such that the portion of the insulation between the conductor and the mandrel is under compression while the conductor is under tension. This specimen, so prepared on the mandrel, is placed in an air-circulating oven and maintained for a period of 7 hours at 300° C. After completion of the air oven test, the specimen is cooled to 23°±3° C. within a period of 1 hour. The wire then is freed from tension, removed from the mandrel and straightened. When the specimen is submitted to a dielectric test, it must be capable of withstanding 2.5 KV for 5 minutes.

It was found that after suitable irradiation each of the compositions described above containing the mixture of the high temperature fluorocarbon polymer and polyvinylidene fluoride with and without radiation crosslinking promoters passed both the solder iron test and the mandrel test while the composition which did not contain polyvinylidene fluoride did not pass the tests.

Additional experiments were conducted with compounds containing Tefzel and Kynar in varying proportions. As Table II illustrates, the resistance to flow or deformation of the various extruded and irradiated compositions under the different temperature, pressure and time conditions of the two tests varied according to the Kynar content and the irradiation dosage. The solder iron test was less severe than the mandrel test. For materials to pass the mandrel test, it was necessary that they possess a high degree of crosslinking but not an excessive amount. Too much irradiational crosslinking would cause premature aging and cracking under the temperature/time conditions of the mandrel test.

The experiments also showed that there were limitations on the amounts of Kynar that can be used in the blend on a practical basis. As the blend approached a Kynar content of approximately 50%, it was observed that a rough coating with tendencies to shred on stripping was produced during extrusion. At 60% Kynar and 40% Tefzel, the extruded blend turned brown and cloudy and formed black decomposition deposits at the extruder tip. The resultant coating was brown and rough. These experiments were terminated at this point except to extrude a coating of Kynar alone. This material required high levels of irradiation to obtain the limited degree of crosslinking needed to pass the less severe solder iron test.

TABLE II

EFFECT OF KYNAR CONTENT ON CROSSLINKING BY IRRADIATION, 10 MIL INSULATION WALL ON 20 AWG CONDUCTOR

SOLDER IRON TEST: 1½ LBS. FORCE, 345° C. ± 10° C., 6 MINUTES MINIMUM
MANDREL TEST: 7 HOURS AT 300° C., ⅛" MANDREL, ¾ LB. LOAD 2.5 KV MINIMUM

| | | | | | | | | | | | | |
|---|---|---|---|---|---|---|---|---|---|---|---|---|
| TEFZEL 280 | 100 | 100 | 100 | 100 | 100 | 100 | 100 | 100 | 100 | 100 | 100 | — |
| KYNAR 460 | — | 1.0 | 1.6 | 3 | 4 | 5 | 8 | 10 | 25 | 50 | 100 | 100 |
| OPTIONAL COMPOUNDING INGREDIENTS | 3.3 | 3.3 | 3.3 | 3.3 | 3.3 | 3.3 | 3.3 | 3.3 | 3.3 | 3.3 | 3.3 | 3.3 |
| DOSE | | | | | | | | | | | | |
| 0 MR | F | F | F | F | F | F | F | F | F | F | F | F |
| 5 MR | F | F | F | F | F | F | $F_1$ | $F_1$ | $F_1$ | $F_1$ | $F_1$ | F |
| 10 MR | F | F | F | F | F | $F_1$ | $F_1$ | $F_1$ | $F_1$ | $F_1$ | $F_1$ | F |
| 15 MR | F | F | F | $F_1$ | $F_1$ | $F_1$ | P | P | P | $F_1$ | $F_1$ | F |
| 25 MR | F | $F_1$ | $F_1$ | $F_1$ | $F_1$ | P | P | P | P | P | P | F |
| 50 MR | $F_1$ | $F_1$ | $F_1$ | $F_1$ | $F_1$ | $F_2$ | $F_2$ | $F_2$ | $F_2$ | $F_2$ | $F_2$ | $F_2$ |

F = FAILS BOTH TESTS.
P = PASSES BOTH TESTS.
$F_1$ = PASSES SOLDER IRON TEST BUT FAILS MANDREL TEST BECAUSE OF EXCESSIVE DEFORMATION OF INSULATION.
$F_2$ = PASSES SOLDER IRON TEST BUT FAILS MANDREL TEST BECAUSE OF CRACKING OF INSULATION.

I claim:

1. A composition comprising a mixture of ethylene tetrafluoroethylene copolymer, polyvinylidene fluoride and a crosslinking promoter, wherein said polyvinylidene fluoride is in an amount of 1.0% by wt. to 50% by wt.; said mixture being a preparation of pellets of crosslinkable ethylenetetrafluoroethylene and pellets of polyvinylidene fluoride which has been coated with a liquid crosslinking promoter, further coated with powdered polyvinylidene fluoride, and blended.

2. The composition of claim 1 wherein the polyvinylidene fluoride has a specific gravity of about 1.75 to about 1.78.

* * * * *